United States Patent Office 3,189,677
Patented June 15, 1965

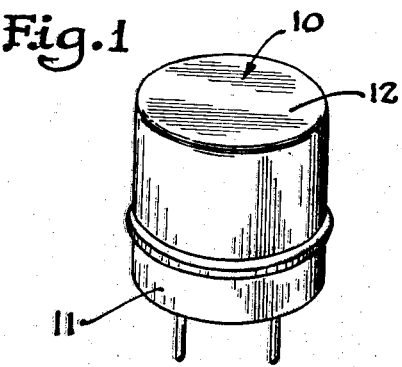
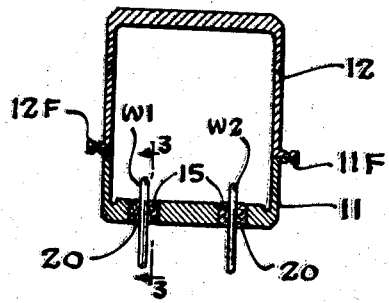
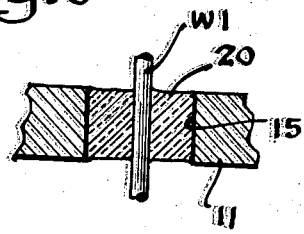
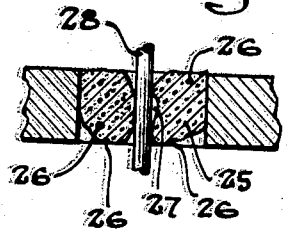
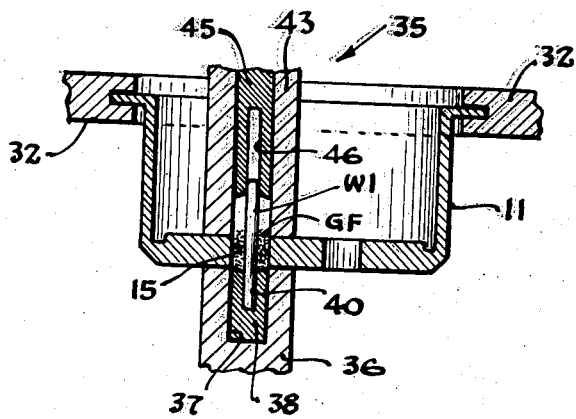
Inventors
Myron L. Anthony
Robert F. Gill, Jr.
By Wallace, Kinzer and Dorn
Attorneys

3,189,677
ALUMINUM ELECTRICAL ENCLOSURES HAVING A TITANIA LEAD GLASS SEAL CONTAINING A CERAMIC MATRIX
Myron L. Anthony and Robert F. Gill, Jr., La Grange, Ill., assignors to Scully-Anthony Corporation, La Grange, Ill., a corporation of Illinois
Filed July 17, 1961, Ser. No. 124,503
1 Claim. (Cl. 174—50.61)

This invention relates to electrical components and in particular to electrical enclosures characterized by a novel ceramic seal between the electrical conductor and the base of the seal.

Electrical components that require protection, such as transistors or the like, are often housed in a so-called enclosure comprising a cup-shaped base having the required number of conductors or lead-in wires for the component extended through one or more openings in the base. It is, of course, essential that the conductors be insulated from one another, and that there be an insulator between each conductor and the adjacent wall of the opening in the metallic base. It is important that the insulator be in the form of a strong, airtight seal since the specifications for enclosed components are usually quite rigid so far as concerns strength and the ability to stay clean.

Such a seal, especially in the instances of miniaturization which is here involved, could be formed advantageously in situ by having resort to a compacted, vitrifiable powdered ceramic material. This, however, entails considerable problems, not the least of which is the fact that the vitrifying temperature for the ceramic powder obviously cannot exceed that which would result in unacceptable thermal damage to the metallic base or the conductor.

The primary object of the present invention is to obtain a strong, physically sound seal in an electrical enclosure of the kind described above, rendered vitreous at a low temperature, and in particular to make possible the production of electrical enclosures wherein the seal displays substantially no internal bubble inclusions or voids at the edges of the seal adjacent the associated metallic parts of the enclosure. Specifically, it is an object of the present invention to make possible such constructions by obtaining the seal from a lead-type powdered glass substantially free of carbon and hydrogen-containing constituents which we believe are primarily responsible for inclusions and voids of the aforesaid kind and which are likely to interfere with the precipitation of a desired crystalline strengthening phase as will be described hereinafter.

In the drawings:

FIG. 1 is a perspective view of a typical electrical enclosure of the kind contemplated under the present invention;

FIG. 2 is a sectional view of the enclosure illustrated in FIG. 1;

FIG. 3 is a sectional view on an enlarged scale of a fragment of the enclosure shown in FIG. 2 and taken on the line 3—3 of FIG. 2;

FIG. 4 is a sectional view illustrating defects engendered in prior practices, overcome under the present invention; and FIG. 5 is a sectional view illustrating the manner in which the powdered glass for the seal is compacted during manufacture of an enclosure.

In FIG. 1 of the drawing there is illustrated at 10 a typical electrical enclosure which includes a base 11 and a cap 12 which, as shown in FIG. 2, are in the form of cup-shaped members having peripheral flanges 11F and 12F, respectively, which are physically joined by a cold welding technique that constitutes no part of the present invention. The members 11 and 12 of the enclosure are aluminum, aluminum-alloy, copper or like pressure weldable metal shapes, and the resultant enclosure may house a transistor or other electrical component connected to conductors in the form of lead-in wires as W1 and W2.

Each of the conductors W1 and W2 is passed through an assigned opening 15 in the enclosure base 11. The conductors must of necessity be insulated from the enclosure base and well anchored in place so that the assembly including the electrical component entailed will be capable of rugged, heavy duty use. To this end, the conductors are insulated from one another and are insulated from the enclosure base by hermetic seals, 20, the composition of which is the subject matter of the present disclosure.

The sectional view of FIG. 3 is an accurate representation of the physical appearance of a seal as 20 obtained under the present invention to the extent that the body of the seal displays substantially no bubble inclusions and displays good wetting characteristics with respect to the periphery of the opening 15 as well as the exterior surfaces of the conductors as W1. Thus, the seal as 20 of the present invention is physically sound and strong due to its being a virtually 100% ceramic continuum characterized by a glass matrix, containing a precipitated strengthening phase, of virtually microscopic gem quality. The strengthening phase is indicated by the stippling in FIG. 3.

In FIG. 4 are illustrated typical defects in a seal 25, overcome under the present invention. The seal 25 displays visible internal bubble inclusions and corresponding surface pinholes 26. A void 27 has developed in the immediate area of the lead-in conductor 28, and the seal displays irregular meniscus contact with the metal parts of the enclosure including the lead-in conductor.

The seal of the present invention is made possible by using glass powders purged of hydrogen and carbon-containing constituents and which advantageously include a nucleating agent which will result in precipitation of the above-noted strengthening phase during final vitrification of the powder. The manner in which this powder is prepared will now be described.

In the present instance, the seal 20 is obtained from a low temperature melting, lead-type glass powder containing a nucleating agent in the form of titania, although other nucleating agents such as alumina can be used. A glass powder of this low melting type enables the vitrified seal 20 to be obtained at temperatures that do not tend to soften the enclosure base 11 or weaken the conductor wires. The following are two examples of the raw batch material that can be processed to obtain a powder identified more specifically hereinafter (parts by weight):

|  | Example 1 | Example 2 |
|---|---|---|
| $TiO_2$ | 22.42 | 11–13. |
| $Fe_2O_3$ | .36 [1] | 0.81 [1]. |
| $Al_2O_3$ | 5.72 | 5–7. |
| $SiO_2$ | 24.79 | 21–25. |
| $PbO$ | 27.81 | 30–33. |
| $MgO$ | .03 [1] | 0.05 [1]. |
| $CaO$ | .01 [1] | 0.02 [1]. |
| $K_2O$ | 9.26 | 12–15. |
| $Cu$ | Trace [1] | Trace [1]. |
| $Cr$ | Trace [1] | Trace [1]. |
| $Sb$ | .85 [1] | 0.82 [1]. |
| $B$ and $Na$ | Remainder | Remainder+Li. |

[1] Natural impurity.

It will be recognized that in the above two examples materials are present capable of occluding and reacting with moisture or carbon dioxide in the air to produce hydrates, hydroxides and carbonates that would represent volatile, non-vitreous materials that tend to contaminate the essential ceramic compounds and interfere with the function of an easily vitrifiable body free of bubble inclusions and like defects noted above. Moreover, such materials detract from optimum development of the precipitated strengthening particles. Therefore, in order to produce a glass powder devoid of gas-generating constituents likely to result in the generation of bubble inclusions during the final vitrification, and one that is free of occluded or combined water, the raw material represented by Example 1 or Example 2 is processed as follows.

The raw material may be in the form of a purchased product having the analysis of Example 1 or Example 2, such being commercially available products. The titania, as will be appreciated from the large amounts involved, is an added nucleating agent, or in other words the ceramic powder in this instance is essentially a lead-type glass containing finely divided titania serving as a nucleating agent for producing an exceedingly fine particle size, precipitating strengthening phase in the ultimate vitrified product represented by the ceramic seal 20 in the electrical enclosure. The alumina present is also a possible nucleating agent. It may be desirable to add an additional nucleating agent such as titanium dioxide to the raw material bases represented by Examples 1 and 2.

In any event, the raw material is preferably ball milled in the presence of sufficient acetone to assure the most advantageous fluidity in the mill. The ball mill is operated for a sufficient length of time to obtain a finely divided product that can be quickly melted as will hereinafter be mentioned. The product from the mill is allowed to settle incidental to decanting the supernatant acetone, and the product is then air dried under a hood, preferably in flat Pyrex-type trays that are covered to be dust free. Drying should not be conducted at a temperature above 105° F. The dried product can be stored in clean jars until the thermal shattering operation is to be completed in the manner described hereinafter.

The foregoing procedure results in a finely divided powder that can be easily melted and one which has not been adversely affected by the acetone. The next step in obtaining a ceramic product is to add approximately 250–275 grams of the dried product from the ball mill to No. 2 size clay crucibles, without packing, leaving approximately one-half inch free at the top of the crucible. The crucibles thus loaded are placed in a furnace operating at approximately 2462° F. (1350° C.). If the furnace and crucibles are preheated, the material in the crucibles need only be fired for about thirty-five minutes to obtain a melt in condition to be thermally shattered as hereinafter described. If the crucibles are not preheated, then the loaded crucibles should continue to be fired for thirty-five minutes after the melt is obtained in the furnace.

The firing procedure removes volatiles such as carbonates and hydroxides, and eliminates free water or water of crystallization that may have incidentally formed, such that the melt in the crucible is devoid of any constituents having melting points lower than the pure lead-type glass. At the same time, the melt is super-saturated with the dissolved nucleasing agent, principally the titania.

At the end of firing, the glass melt is poured quickly onto a clean, dry, chilled surface in as thin a film as possible. Advantageously, this surface is represented by a square aluminum block chilled by being supported on slabs of Dry Ice. Immediately after the melt is poured to produce the thin film aforesaid, the film is covered and sandwiched by a similar aluminum block having a slab of Dry Ice supported on the top thereof. This substantially excludes the atmosphere and safeguards the poured melt against contamination by moisture or carbon dioxide in the air. Resultantly, the poured film is rapidly quenched and shatters into chunks or flakes that will vary from pieces about three inches on a side to fines of extremely small particle size, and when the sound of shattering has ceased after several minutes of having the glass film sandwiched between chilled aluminum blocks as aforesaid, the largest of the shattered pieces of glass are transferred quickly to a clean airtight can and allowed to cool until all cracking has ceased. The super-saturated condition aforesaid is fixed.

The glass pieces are next transferred quickly to clean, air-tight jars. In all instances, care is taken to eliminate the fines, because these are likely to occlude moisture and gases from the air. The shattered pieces should be restricted to those not much smaller than approximately one-quarter inch on a side.

The glass jars containing the shattered ceramic from which low melting point constituents have been eliminated, in effect by distillation, are transferred to and opened in a sealed, air-tight, desiccated chamber where final processing is to be completed. This chamber contains moisture and cabon dioxide-absorbing chemicals so that the state of the glass will be maintained.

The first operation in the desiccated chamber is that of grinding the shattered flakes with a stainless steel mortar and pestle. This is a hand operation and is carried out, as are all subsequent manual operations in the desiccating chamber, with gloves secured in place at glove ports on the walls of the chamber.

During the course of obtaining a finely divided product in the mortar, care should be taken to avoid the excessive production of fines and dust. In other words, coarse particles are desired at this stage, approximately one-eighth inch screen size. Advantageously, the product obtained in the mortar is screened to this size in the desiccated chamber, with any larger particles being returned to the mortar.

Without undue delay, and while still working in the desiccated chamber, the collected coarse glass particles obtained by the mortar and pestle action are processed in a hammer mill, preferably to produce the following fractions:

(1) On 80 mesh
(2) Thru 80 on 120 mesh
(3) Thru 120 on 170 mesh
(4) Thru 170 on 230 mesh
(5) Thru 230 on 325 mesh
(6) Thru 325 on Pan Separation of the above fractions takes place in a screen shaker operated in the dry or desiccated chamber.

The resultant fractions with the exception of fraction (1) are individually packaged in the desiccated chamber, with as little delay as possible. Fraction (1) is either immediately run back through the hammer mill or is packaged for subsequent re-running.

The finally packaged fractions are lead-type glass powders containing a nucleating agent in a super-saturated state. These powders can be vitrified at approximately 1000° F. resulting in a strong, physically sound ceramic body having no visible bubbles or noticeable peripheral shrinkages or voids. The product additionally displays inherent ability to precipitate a strengthening phase in the form of complex oxide particles, such as titanate crystals, which on average are less than one micron in diameter. The physical soundness and easy development of the precipitated strengthening phase are due to a glass powder which is virtually one hundred percent devoid of carbon and hydrogen-containing constituents which will volatilize at the aforesaid vitrifying temperature.

Thus, the finely divided glass product obtained by the desiccating procedure above described, and containing a fixed nucleating agent primarily in the form of titania in super-saturation, is to be used in the production of electrical enclosure seals such as those identified at 20 in FIG. 2. In completing the seal, the procedure is to first of all arrange the base of the enclosure, such as the base 11, in the holding fixture 32, FIG. 5, of a press 35. The press includes an anvil 36 serving as a back-up member for the underside of the base 11, and the anvil 36 is provided at its upper end with an upwardly opening recess 37 in which is located a die 38. The die 38 is formed with an upwardly opening pocket 40 in which one of the conductor elements as W1 of the enclosure is disposed to project from the die 38, noting that the anvil and die 38 are so oriented that the opening 40 in the die will be disposed to support the conductor W1 upright within the related opening 15 of the enclosure base that is to have a seal as 20 formed in situ therein under the present invention.

The press includes a hold-down device or plunger 43 in the form of a sleeve having an annular end surface of such dimension as to be complemental to the immediate annular area of the base 11 surrounding the opening 15. The lower end of the plunger or sleeve 43 is to be urged forcefully into holding engagement with the marginal area of the base 11 on the side thereof opposite that supported by the upper end of the anvil 36.

Next, a measured amount of the glass powder GF of desired mesh size is flowed into the annular space between the conductor W1 and the peripheral wall defining the opening 15 in the base 11. This operation and the final compacting step are carried out as quickly as possible so that the glass powder will remain substantially in its pristine state.

The clamping force of the anvil 36 and opposed plunger 43 is to be sufficient to constrain the external marginal portions of the base surrounding the opening 15, thereby to prevent, during final compaction, any significant expansion of the peripheral wall in the base 11 defining the opening 15. At the same time, escape of glass powder fractions is prevented, the flat faces of the enclosure base surrounding the pin opening are maintained free of contaminating glass powders, and the plunger 43 allows an adequate volume of loose powders to be made available for each seal. The second of the foregoing features is important to a physically clean enclosure as well as one that is thermally clean since random glass powders, on the flat enclosure surfaces surrounding the seal opening, will fuse in place and disrupt the continuity of the metal enclosure surfaces.

The press 35 includes a vertically movable punch or ram 45 that is movable along an axis parallel to the axis of the upright conductor or wire element W1. To this end, the die 45 is formed with an elongated passageway 46 into which the free end portion of the wire conductor W1, opposite the die 38, is adapted to extend when the ram 45 is driven downward with sufficient force to compact the glass powders to the desired degree.

Thus, the punch or ram 45 represents the final operative element of the press 35 and the operating ends of the die and punch are configured to impart the desired geometry to the exposed faces of the seal, such as the slightly truncated cones shown in FIG. 5. After the base 11 is clamped effectively between the anvil 36 and the sleeve 43, the ram 45 is driven downward with a force that will compact the glass powders to approximately 95% of theoretical density. This is approximately 200,000 to 300,000 p.s.i. or greater. The punch is thereafter retracted.

The press is operated in like manner for all of the leads as W1 and W2 that are to be included in the enclosure, although it will be appreciated that fully automatic and simultaneous operations on all leads are possible. There may be as many as forty leads in a large enclosure with assurance of a sound seal for every lead because of the reliable fabrication represented by the present invention.

The resultant enclosure containing the "green" or unfired seals is removed from the press and is transferred to an oven operating at the vitrifying temperature of the compacted frit, approximately 1000° F. for about one-half hour, or possibly higher depending upon whether the base 11 is substantially pure aluminum or an aluminum alloy. The higher the temperature, the more quickly the seals can be vitrified. In any event, with the type of ceramic here involved, it is possible to obtain complete and final vitrification at a time-temperature relationship that does not adversely affect either the enclosure base 11 or the conductors as W1 and W2, which may be stainless steel. Even so, in spite of the low temperatures involved, the resultant seal as 20 is substantially devoid of visible internal bubble inclusions and displays no marked shrinkage or voids adjacent the metallic surface of the enclosure. This is due to the fact that the compacted glass powed is substantially devoid of gas-generating constituents such as hydrogen and carbon-containing materials likely to break down or volatilize at the vitrifying temperature.

Additionally, the seal is mechanically strong, because there are present substantially no non-ceramic contaminants likely to interfere with the development of the desired crystalline strengthening phase in the glass matrix, manifest in the precipitation therein of strengthening particles in the form of titania complexes such as titanate crystals or aluminates, of an average particle size of one micron or less. It may finally be noted that the exterior surface of the seal displays no adverse meniscus geometry likely to present weak sections adjacent the metallic parts. In other words, the vitrified seal 20 retains substantially the profile of the punch and die, although there is a slight creepage or flow at the instant of vitrification causing some flattening out of the seal or a slight and uniform meniscus effect as shown in FIGS. 2 and 3. This again is believed to be due to the purity of the glass powder.

The chilling method described above is merely a preferred procedure. Other techniques can be used such as pouring the melt in chilled tube-type molds presenting clear, dry surfaces substantially to the exclusion of the ambient atmosphere.

We claim:

In an electrical enclosure, a metallic base of aluminum having an opening therein, a conductor extended through said opening, and a seal between the conductor and the periphery of said opening, said seal being substantially devoid of bubble inclusions and voids adjacent the conductor and the periphery of the base opening, and to this end consisting essentially of a vitrified ceramic matrix obtained from a lead-type powdered glass vitrifying at a temperature less than the melting point of aluminum and being substantially free of carbon and hydrogen-contain constituents, said matrix containing particles precipitated around titania nuclei.

References Cited by the Examiner

UNITED STATES PATENTS

| | | | |
|---|---|---|---|
| 1,306,259 | 6/19 | Keyes | 174—50.63 |
| 1,562,533 | 11/25 | Weintraub | 174—50.63 |
| 2,248,644 | 7/41 | Reger | 49—81 |
| 2,386,685 | 10/45 | Hood | 65—157 X |
| 2,920,971 | 1/60 | Stookey | 65—33 X |
| 2,950,574 | 8/60 | Slater | 49—81 |
| 3,006,984 | 10/61 | Bol et al. | 174—50.61 X |
| 3,024,118 | 3/62 | Hessinger | 65—18 X |
| 3,084,053 | 4/63 | Arlett | 106—53 X |

JOHN F. BURNS, *Primary Examiner.*

BENNETT G. MILLER, DARRELL L. CLAY, JOHN P. WILDMAN, *Examiners.*